Feb. 3, 1925.
R. STAHL
MOTOR SUSPENSION
Filed Aug. 18, 1922
1,524,955
2 Sheets-Sheet 2
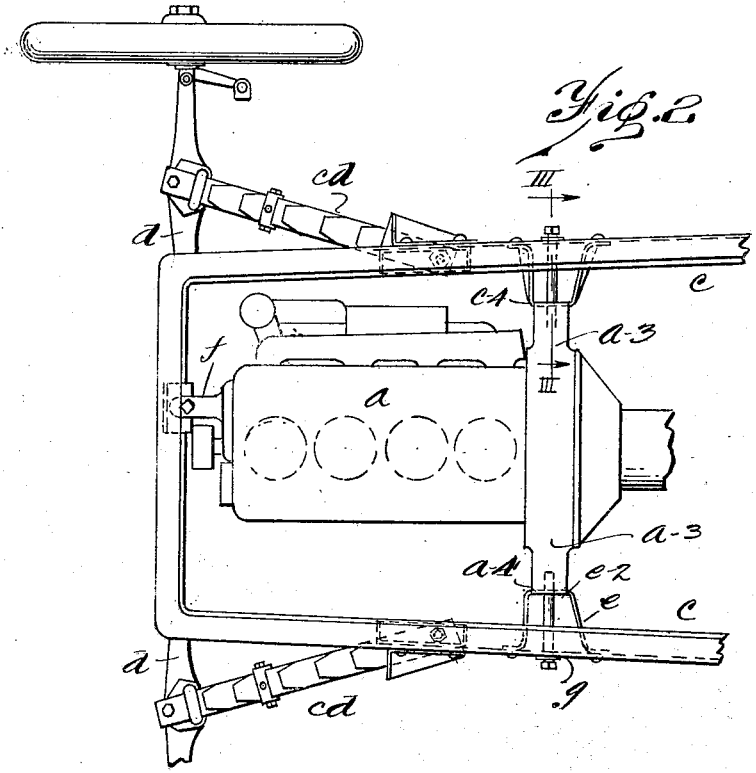
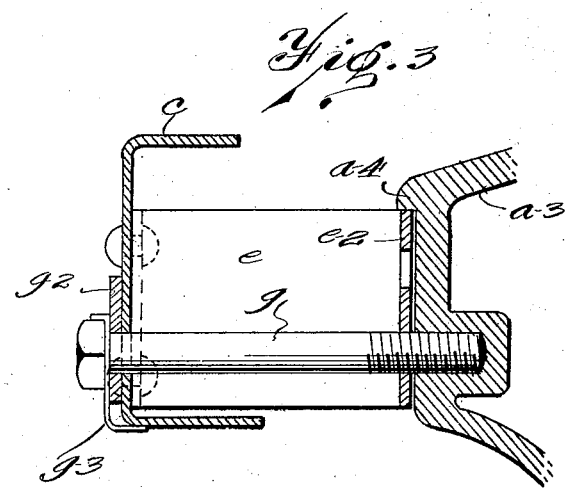
Inventor
Rodolph Stahl
By Ralzemond A. Parker
Attorney Patented Feb. 3, 1925.

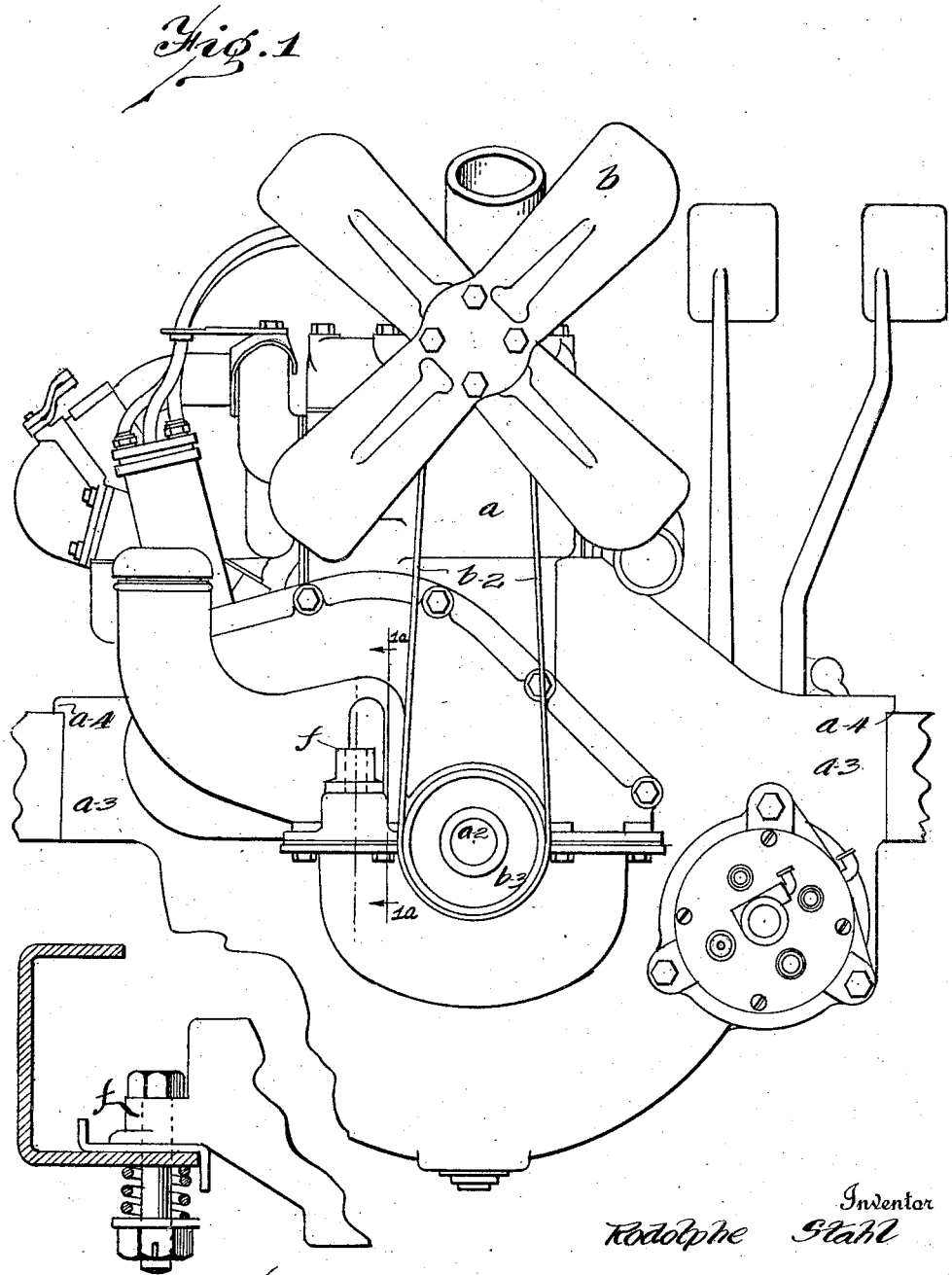

1,524,955

UNITED STATES PATENT OFFICE.

RODOLPHE STAHL, OF DETROIT, MICHIGAN.

MOTOR SUSPENSION.

Application filed August 18, 1922. Serial No. 582,739.

*To all whom it may concern:*

Be it known that I, RODOLPHE STAHL, a citizen of the United States, residing at Detroit, county of Wayne, State of Michigan, have invented a certain new and useful Improvement in Motor Suspension, and declare the following to be a full, clear, and exact description of the same, such as will enable others skilled in the art to which it pertains to make and use the same, reference being had to the accompanying drawings, which form a part of this specification.

My invention relates to motor suspension for automobiles and consists in the improvements hereinafter described and pointed out in the claims.

In the drawings,—

Figure 1 is a front elevation of apparatus embodying my invention.

Fig. 1$^a$ is a detail section on the line I$^a$—I$^a$, Fig. 1.

Fig. 2 is a plan view of the same.

Fig. 3 is a detail section on the line III—III of Fig. 2.

$a$ is the engine. $c$, $c$ are the side pieces of the chassis of the automobile. $d$ is the front axle. $cd$, $cd$ are the springs connecting the chassis and the front axle. These springs diverge outwardly, as distinctly shown in Fig. 2, from their attachment to the chassis and are secured to the front axle $d$ at some distance laterally from the chassis of the automobile.

$e$, $e$ are brackets for supporting the end of the engine. One of these brackets is located on each side of the chassis and engine and they are of the same construction. The bracket $e$ is of U-shape in plan, having the ends of its two branches flanged and riveted within the channel of the side piece of the automobile to the web thereof. $e^2$ is the cross-piece extending between the branches of the bracket at their ends in a plane parallel to the axis of the engine.

$a^3$, $a^3$ are lugs extending laterally from the rear end of the engine $a$.

$g$ is a nickel-steel bolt extending through an aperture in the side piece $c$ and engaging a lug $a^3$ of the engine, as shown in Fig. 3. This bolt also extends through an aperture in the cross-piece $e^2$ of the bracket $e$ toward the lower edge of said bracket.

$a^4$ is a lip extending from each of the lugs $a^3$ and engaging over the upper edge of a bracket $e$.

In a multiple cylinder internal combustion engine the auxiliary parts are usually placed upon one side of the cylinder casing so as to bring the center of gravity of the motor to the right of the center line of the crankshaft. In the so-called three-point support for motors it has been customary to secure the motor at two points at the side of the same toward the rear and at a single point approximately in the vertical plane through the engine shaft at the front. I have found that this involves unnecessary strains and have, therefore, placed the securing lug $f$ in a vertical plane parallel to the axis of the crankshaft through the center of gravity of the motor. $f$ is the securing lug placed toward the right of the engine so as to make it correspond to the center of gravity of the motor. This is bolted to the front cross-piece of the chassis.

The diverging springs $cd$, $cd$ bring a twisting action upon the side pieces $c$, $c$ of the frame. The U-shaped brackets $e$ permit of the use of a long nickel-steel bolt $g$ which is attached at its ends and permits of a slight give and resiliency that prevent excessive strains upon the joint.

What I claim is:

1. An engine having its center of gravity in a vertical plane at one side of the center line of the crankshaft, said engine being supported at two opposite points at its rear end and at a single point at its forward end in the vertical plane through the center of gravity.

2. In an apparatus of the kind described, the combination of a chassis having a side piece, a U-shaped bracket secured to said side piece and extending inward, a motor resting upon the inner end of said bracket, said motor engaging the outer end of said bracket over an extended surface in a vertical plane, an elastic bolt secured to said side piece extending axially through said bracket and engaging said motor at an intermediate point in said vertical engaging surface, and a spring secured at one end to said side piece diverging outward and secured at the other end to the axle.

In testimony whereof, I sign this specification.

RODOLPHE STAHL.